United States Patent

Lange et al.

[11] Patent Number: 5,947,268
[45] Date of Patent: Sep. 7, 1999

[54] SELF ADJUSTING ELECTRIC TAPPET SWITCH

[75] Inventors: Reinhard Lange, Gaienhofen-Horn; Klaus Müller, Aach; Ralf Elting, Radolfzell; Wolfgang Huber, Deisenhausen, all of Germany

[73] Assignee: TRW Fahrzeugelektrik GmbH & Co. KG, Germany

[21] Appl. No.: 08/961,619

[22] Filed: Oct. 31, 1997

[30] Foreign Application Priority Data

Oct. 31, 1996 [DE] Germany ............... 196 45 058

[51] Int. Cl.$^6$ ........................... H01H 13/70
[52] U.S. Cl. ............... 200/345; 200/295; 200/296
[58] Field of Search ............ 200/61.76–61.84, 200/61.83–61.91, 341–345, 295, 296, 318.1, 318.2, 294

[56] References Cited

U.S. PATENT DOCUMENTS

| | | | |
|---|---|---|---|
| 3,710,048 | 1/1973 | Schumacher et al. | 200/61.89 X |
| 4,316,065 | 2/1982 | Rupp et al. | 200/61.89 |
| 4,604,506 | 8/1986 | Gebhardt et al. | 200/61.89 |
| 4,684,769 | 8/1987 | Beck et al. | 200/61.89 |
| 4,698,466 | 10/1987 | Beck et al. | 200/61.78 |
| 4,739,133 | 4/1988 | Nation et al. | 200/61.76 X |
| 4,948,930 | 8/1990 | Karlsson | 200/82 R |
| 5,162,625 | 11/1992 | Comerford | 200/61.89 |
| 5,389,756 | 2/1995 | Micallef | 200/345 |
| 5,512,717 | 4/1996 | Magome et al. | 200/295 |
| 5,534,672 | 7/1996 | Meagher | 200/61.89 |
| 5,826,709 | 10/1998 | Jacob | 200/345 |
| 5,853,084 | 12/1998 | Carter et al. | 200/318.2 X |

FOREIGN PATENT DOCUMENTS

| | | | |
|---|---|---|---|
| 2 441 258 | 6/1980 | France | H01H 13/16 |
| 2 532 105 | 2/1984 | France | H01H 3/14 |
| 35 27 874 A1 | 2/1987 | Germany | H02B 1/04 |
| 39 13 774 A1 | 12/1989 | Germany | G05G 15/04 |
| 42 15 515 C1 | 8/1993 | Germany | H01H 13/20 |
| 2 282 005 | 3/1995 | United Kingdom | H01H 3/16 |

OTHER PUBLICATIONS

EP 97 11 7799 European Search Report

*Primary Examiner*—J. R. Scott
*Attorney, Agent, or Firm*—Fay, Sharpe, Beall, Fagan, Minnich & McKee, LLP

[57] ABSTRACT

A self-adjusting electric tappet switch includes a slider linearly guided in a housing for activation or closure of one of several electrical contacts and a tappet which is selectively rotatable relative to the slider for adjustment of the travel limit of the switch. The slider has a first engagement portion provided with engagements parts, and the tappet includes a corresponding second engagement portion having an oblong cross-section provided with spaced apart circumferential grooves. The switch is self-adjusted by relative rotational movement between the slider and the tappet to lock the pair together. In an installation and adjustment position of the tappet and slider system, the slider is held in a predetermined fixed switching position in the housing to permit relative longitudinal slidable movement between the tappet and the slider for adjustment of the tappet without causing any movement of affecting the position of the slider within the housing. After the length of the tappet and slider is set, are locked together by relative rotation therebetween. Displacement of the tappet within the housing causes a corresponding movement of the slider thereby carried on the tappet within the housing relative to the electrical contacts.

14 Claims, 6 Drawing Sheets

SELF ADJUSTING ELECTRIC TAPPET SWITCH

BACKGROUND OF THE INVENTION

The subject invention is directed toward the art of self-adjusting electric tappet switches and, more particularly, to self-adjusting automotive brake light tappet switches of the type generally including a displaceable tappet member carrying a slider guided within a housing member for activating one or several electrical contacts contained within the housing to actuate an automotive brake light.

The invention is especially well suited for incorporation into automotive brake light circuits and will be described with reference to that application; however, as will become apparent, the invention is capable of broader application and could be incorporated in a variety of components or used as a separate self-adjusting electric tappet switch for many purposes.

Self-adjusting electric tappet switches are typically used in automotive brake light switch applications because they provide simple equalization of tolerances between the back side of brake pedal linkages and the vehicle metal bodies holding the brake light switch housings in place in openings provided for accepting and fastening the switch housings to the vehicle.

One such known self-adjusting electric tappet switch produced by the assignee of this application includes a tappet member provided with a plurality of circumferential first stop elements. The first stop elements cooperate with a plurality of corresponding second stop elements provided on a slider member comprising the known self-adjusting electric tappet switch. The slider member is slidably received in the switch housing and the tappet member is held in the slider member by cooperation of the first and second plurality of stop elements. During installation of this switch into the metal automotive vehicle bodies, the switch housing is inserted from a face surface of the surrounding metal as viewed relative to the brake pedal, and into an acceptance opening provided in the metal body. The head of the elongate tappet member extending from the switch body is thereby pressed against the upper side of the brake pedal member. In the above-described adjustment and mounting position, the elongate tappet member is engaged with the slider member in the housing with the tappet member extending from the switch housing to its fullest extent.

At this stage, if the head of the tappet member is moved in the direction of the upper side of the switch housing because of abutment against the upper side of the brake pedal, then the tappet and slider system is first moved into the switch housing until a specified switch position is reached. This switch position is preferably defined by a slider stop located in the housing. The tappet of the switch is designed with a minimum length so that the switching position will be achieved during installation of the switch in the acceptance opening of the metallic vehicle body member. However, if the distance between the holding metal and the upper side of the brake pedal is smaller than the required displacement path of the tappet and slider system for attaining the above switching position, then additional pressure is exerted upon the tappet member during installation of the switch housing into the acceptance opening through abutment of the head of the tappet member against the upper side of the brake pedal. As a result of this additional pressure, the threshold value force is surpassed for the arresting displacement of the tappet relative to the slider and automatic adjustment of the tappet takes place.

After complete installation of the switch into the acceptance opening in the position in which the upper side of the switch housing abuts against the underside of the holding metal, the tappet switch is fixated in the acceptance opening by rotation of the switch body or housing through a predetermined specified angle. To that end, the switch housing described above includes one or more projections which project during installation of the switch into the acceptance opening and corresponding encoding recesses. The several projections grab behind the metal vehicle body after rotation of the switch housing through the above-mentioned predetermined angle around the longitudinal axis of the switch.

One disadvantage, however, with respect to switches of the general type described above is that under certain circumstances there may be unintentional displacement of the specified stop position between the tappet member and the slider member. This can be caused, for example, due to heat expansion of switch components or due to wear of the stop areas. Manipulation of the brake pedal height or body panel or other support structure in the area of the switch after completion of the switch self-adjustment steps, can also lead to unintentional misadjustment of the desired stop position. This results in an undesirable displacement of the switching point to a point beyond the original setting so that the brake light of the vehicle is not switched on until a given position of the brake pedal is reached, in which significant brake effect may have already been attained. Prior to this electric switching point, other vehicles on the road following a vehicle experiencing the above-noted switch disturbance, receive no indication at all with respect to the braking process previously commenced.

German Patent Application 196 03 135.4 assigned to the assignee of the instant application describes a self-adjusting and lockable tappet switch which solves some of the above-noted problems. With this switch, the tappet and slider member system can be changed from an adjustment position to a locked position through mere rotation of the tappet member around its longitudinal axis. In the locked position, movement of the tappet member relative to the slider member is not possible.

One disadvantage, however, of switches of the general type described above is that during the adjustment process, initially the slider and tappet members must be brought into a defined position relative to each other before displacement takes place of the tappet member relative to the slider member for the adjustment itself to be effected. This requires a relatively long displacement path during installation of the switch and, furthermore, as a result of mechanical tolerances, worn locking means, or the like, displacement of the tappet member relative to the slider member may have previously occurred without the tappet member being in the specified switching position. As a consequence, the desired switching point may not be reached under certain circumstances. In that case, the automotive brake light switch mechanism is ineffective to operate the vehicle braking light circuit.

Another disadvantage of switches of the general type described above is that additional work or effort is necessary to install and lock the switch into position through the appropriate rotational motion. The installer cannot readily simultaneously twist the tappet switch at the same time the switch is inserted into the installation opening. Because tappet switches known in the art become lost into the installation opening and therefore access to the switch from the installation side becomes nearly impossible, installers of these type of switches find it difficult to use them. In addition, the installation and necessary self-adjustment process becomes very difficult. In these cases, the installation by turning of these tappet switch require additional maneuvering or an additional action and thus increase the installation expense.

SUMMARY OF THE INVENTION

The subject invention provides an improved self-adjusting tappet switch which practically eliminates, in a simple fashion, any defective installation and, which evidences a high degree of operating and installation safety while safely preventing any unintended maladjustments of the switch system.

In accordance with a first preferred embodiment of the invention, there is provided an improved self-adjusting tappet switch including a housing, a slider member guided in the housing for activating one or more electrical contacts and a tappet member displaceable relative to the slider member. The slider member has a first engagement means and the tappet member has a corresponding second engagement means. The slider and tappet members are selectively arresting connectable and/or lockable with each other. At least one of the tappet or slider members are formed in cross section in such a manner that at least one of the two parts is retained torsion-proof or non-rotatable during installation into an opening of an operatively associated part. The other part is retained torsion-proof or non-rotational within the housing. First and second means of engagement are provided on the tappet and slider members such that the tappet and slider members are changed from an adjustment and installation position to a locked position by rotation of the housing while the tappet and slider members are engaged with the opening in the installation part. The rotation of the housing causes relative movement between the tappet and slider members to lock the first and second engagement means together.

In accordance with the invention, there is provided an improved self-adjusting tappet switch including a housing, an electric switch contact carried on the housing, an elongate tappet member adapted to engage a motor vehicle brake pedal and a slider member carried on the elongate tappet member and adapted to engage and activate the electrical switch contact based on movement of the tappet member relative to the housing. The slider member is movable within the housing between a first slider member position and a second slider member position. In the first position, the slider member is spaced apart from the electrical switch contact. In the second slider member position, the electrical switch contact is activated by the slider member to in turn close an operatively associated external motor vehicle brake light circuit. The elongate tappet member is selectively movable within the housing between a first installation and adjustment position and a second locked position. A one of the slider or tappet member are provided with a plurality of circumferential grooves and have a cross section of varied width. The respective other one of the slider or tappet members carry engagement parts adapted to engage the grooves. In the installation and adjustment position, the elongate tappet member is movable relative to the slider member to facilitate the mounting of the switch and adjustment of the tappet member between the motor vehicle body frame and the brake pedal. In the second locked position, an engagement portion of the tappet member mateably connects a corresponding portion of the slider member so that the slider member moves with the elongate tappet member in response to movement of the brake pedal on one end of the tappet member causing the electrical switch contact to close.

In accordance with a somewhat more limited aspect of the invention, the tappet member is rotationally movable within the housing between the first installation and adjustment position and the second locked position. Further, the tappet member is adapted for longitudinal slidable movement relative to the slider member when the tappet member is in the first installation and adjustment position.

As can be appreciated, a primary object of the present invention is the provision of a new and improved self-adjusting tappet switch which substantially eliminates, in a simple fashion, any defective installation of the switch in a motor vehicle while maintaining a high degree of operating and installation safety.

It is an advantage of the invention that the slider member is positioned in the desired switching position within the housing during installation and adjustment of the switch in a motor vehicle. Inasmuch as during the actual adjustment process, the slider need not be moved, greater installation and operating safety directly results. After the adjustment process, the tappet member and switch are joinable via the electric contact means, so that only then a displacement of the slider is possible and necessary in order to produce electric switching movements.

It is another advantage of the present invention that the cross section of the tappet or slider members are formed to engage corresponding constructions on the target installation opening so that either the tappet member or the slider member is held non-rotatably in the acceptance opening and the respective other part is held non-rotationally in the housing. Thus, by means of a simple rotation of the switch housing around a specific angle, the tappet and slider members are thereby locked within the housing effecting switch adjustment. This is particularly beneficial with respect to lowering the expense of installing the switch. In the first preferred embodiment of the invention described below, the first attachment means provided on the housing are adapted to engage a corresponding attachment means provided on the installation part whereby rotation of the housing produces both a locking of the tappet and slider member system as well as a simultaneous connecting of the switch housing into the acceptance opening of the installation part.

It is a benefit of another preferred embodiment of the invention that the tappet and slider members have first and second attachment means which allow a notched displacement of one of the two elements relative to the other in an angular position defining the installation and adjustment position.

When employed as a motor vehicle brake light switch, the switching movement of the subject invention is produced through activation of the motor vehicle brake pedal. It is to be noted, however, that switches of this type are arranged adjacent brake pedal linkage which, upon activation of the brake pedal, move in a direction having a tendency to increase the distance between the switch and the respective upper or underside of the brake pedal. In other words, when the brake pedal is activated, the tappet member, together with the slider member, is moved in a direction out of the switch housing due to tensioning by a resilient spring element within the housing. It is an advantage of the present invention that the subject self-adjusting tappet switch is usable in the opposite orientation or direction where the tappet member and slider member are moved together into the switch housing for activation of the electric contacts therein.

Another advantage of the preferred embodiment of the invention is that the slider member is acted on by a resilient spring element and held in a predetermined switching position spaced apart from the electric contacts while the tappet and slider members are disposed in the mounting and adjustment position. To facilitate switch adjustment, the connection force between the tappet member and the slider member while in the mounting and adjustment position is matched to the triggering force of the resilient spring element in such a manner that displacement of the tappet member relative to the slider member takes place in the mounting and adjustment position without a deflection of the slider member from the predetermined switching position. For that purpose, the tappet and slider members are preferably designed in such a manner that in the mounted and adjustment position, the tappet and slider members are slidably displaceable in the housing.

Still yet another advantage of the present invention is that while in the mounting and adjustment position, the tappet member is acted upon by a second resilient spring element so that the tappet member may be moved against a stop element on the housing limiting the tappet member movement in a direction away from the housing.

One benefit of the present invention is that the switching position of the slider member is defined by a stop element disposed in the housing. The stop element is only effective for maintaining the switching position of the slider member while the slider and tappet members are in the mounting and adjustment position. After changing over the tappet and slider members into the locked position, the stop elements are simultaneously moved out of the way enabling the slider member to move in a direction toward the electric contacts in the housing for activating the electric contacts. The stop lug member is formed by a separator piece in a recess of an operatively associated installation part on the motor vehicle body. The tappet member is coaxially guidable through the stop lug and recess.

The slider member and separator piece preferably have projections and/or recesses which cooperate in a manner that in the adjustment and installation position, the slider member is held in the switching position and, in the locked position, the projections and/or recesses engage each other and release movement of the slider member from the switching position in order to activate or deactivate the electric contacts in the housing.

It is an advantage of the first preferred embodiment of the invention that a twisting a rotational movement of the switch housing is possible only when the tappet and slider system is physically moved far enough into the switch housing until the torsion-proof connection of an attachment part on the housing is disengaged from the installation part. The part which is torsion-proof connected with the housing (tappet or slider member) is preferably designed that the twisting of the switch housing is possible only when the slider is in the switching position which it is to occupy after the installation of the switch in the vehicle body panel. For that purpose, the slider member preferably includes a circumferential projection formed in a longitudinal direction which engages a corresponding encoding recess in the installation opening whereby the upper edge of the projection is arranged in such a manner that rotation of the switch housing, and thus rotation of the slider which is torsion-proof connected with the switch housing, is released only when the slider member is at least approximately in the desired switching position.

In another specific embodiment of the invention, the slider and tappet system is biased with a resilient spring element while in the installation and adjustment position and held in a predetermined switching position. The connection between the tappet and slider member in the installation and adjustment position is preferably attuned to the tensioning force of the resilient element such that displacement of the tappet member toward the slider member in the installation and adjustment position occurs without deflection of the slider member from the switching position. For that purpose, the slider and tappet member are preferably designed such that in the installation and adjustment position, slidable displacement between the tappet and slider member is made possible.

It is another advantage of the invention that the desired switching position of the slider member is defined by a stop lug which is effective only in the installation and adjustment position and permits, following rotation of the switch housing and locking of the tappet switch system together, that the slider member moves out of the switching position in order to activate and deactivate the electrical contacts. The stop lug, however, limits the movement of the slider in the opposite direction, i.e., in the direction in which the tappet is moved out of the switch. The stop lug is preferably formed in one specific embodiment of the invention by means of a separation piece, held torsion-proof in the installation part in a recess thereof through which the tappet member is coaxially guided. The separation piece and the slider member preferably include projections and/or recesses which cooperate in such a manner that the slider member is held in the switching position while in the adjustment and installation position. In the locked position, the projections and/or recesses engage each other and release the movement of the slider member from the switching position in order to activate and deactivate the electric contacts.

It is another advantage of one preferred embodiment of the invention that the tappet member is stressed or biased by a resilient spring element in such a manner that it is moved in the direction out of the switching housing whereby the tappet member preferably includes a stop to limit the movement.

The above specific preferred embodiments of the invention have the overall advantage that the destruction of or damage to the switch can be prevented in a simple fashion because the housing is advantageously formed to accommodate gross movements of the tappet member into the housing due to faulty operation or unexpected use of the switch. In that regard, an adequate displacement path for tappet and slider member movement is provided for in the housing. A benefit of this construction is that additional stop lug members or similar tabs or stops or the like are not necessary for blocking movement of the tappet or slider members into the housing to prevent destruction thereof.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 4b is an outline of an installation opening adapted for receiving the switch shown in FIG. 4a;

DETAILED DESCRIPTION OF THE PREFERRED EMBODIMENT

Figure 1:
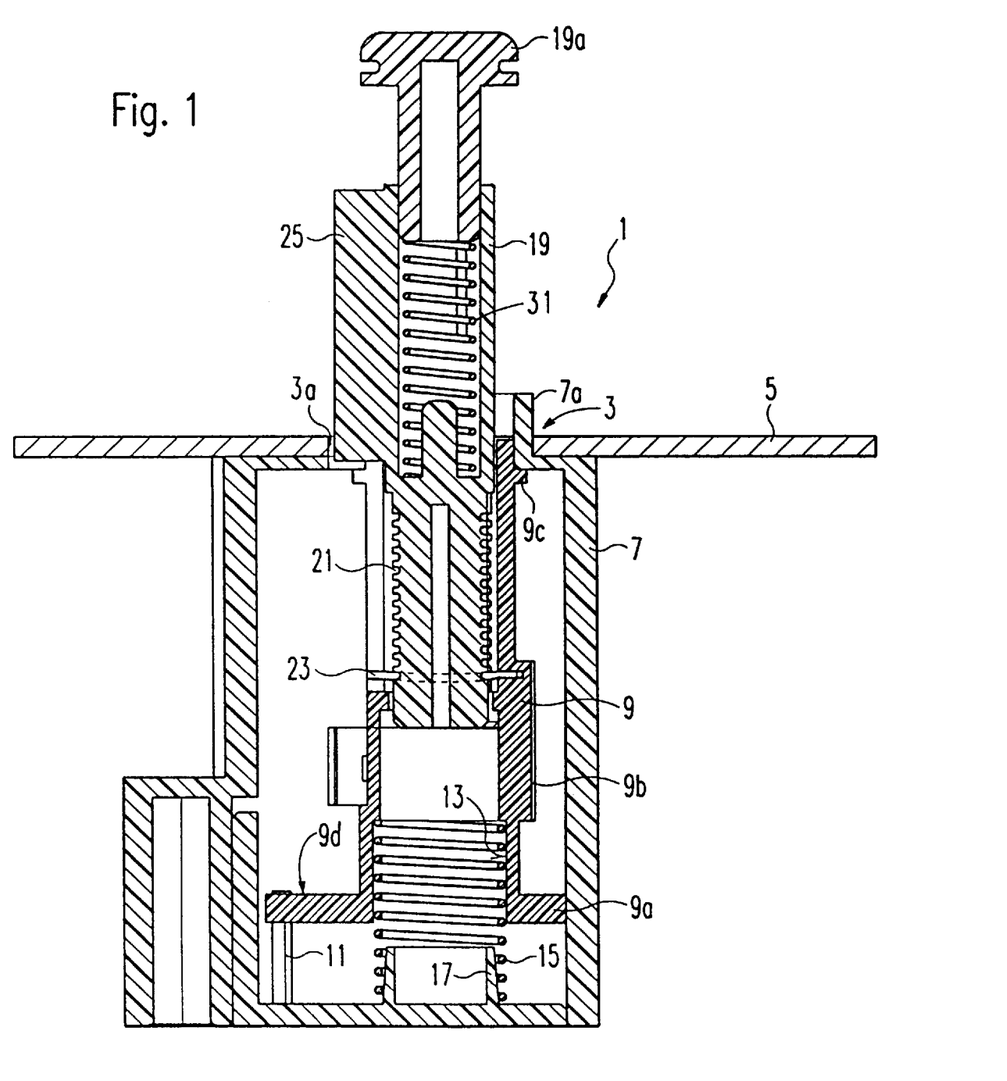
FIG. 1 is a longitudinal section through a first preferred embodiment of a switch in accordance with the present invention taken along line 1—1 of FIG. 2.
Figure 2:
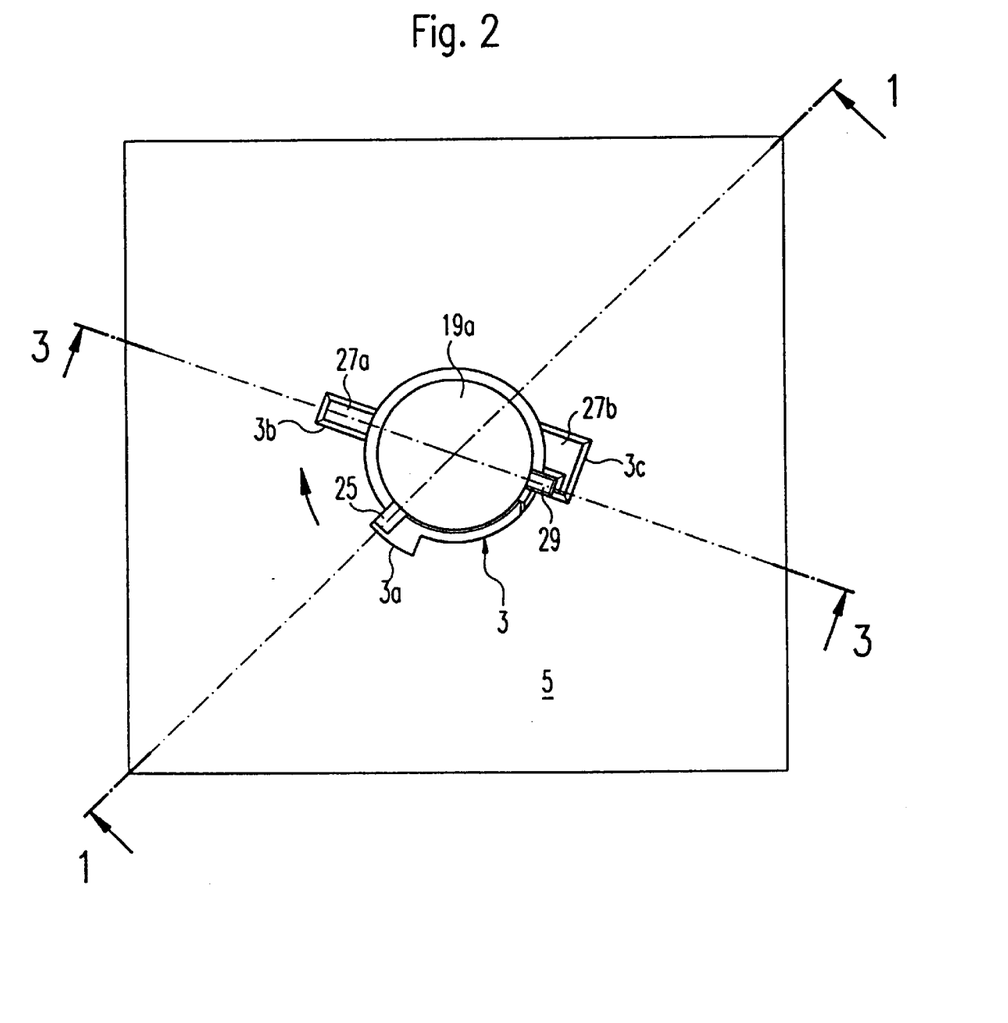
FIG. 2 is a top view of the switch shown in FIG. 1.
Figure 3:
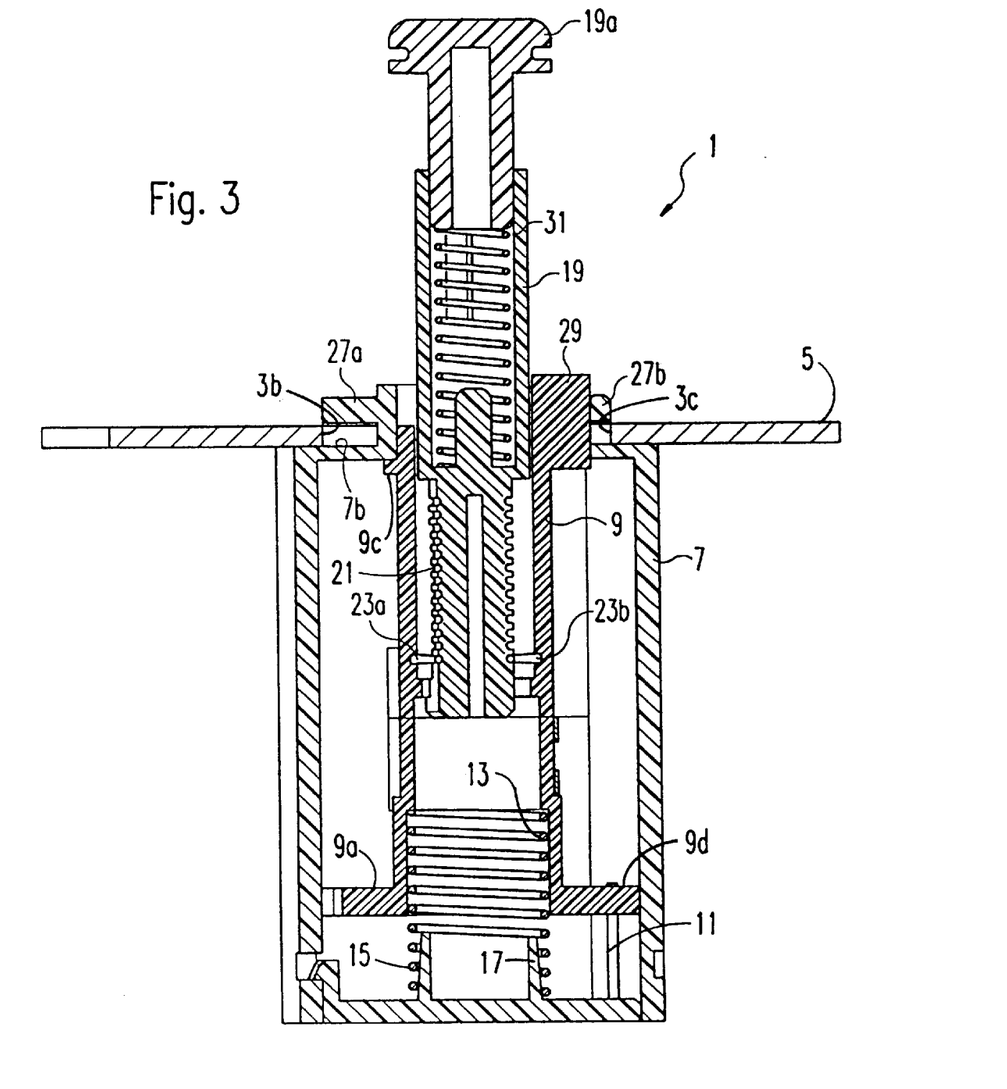
FIG. 3 is a longitudinal section taken along line 3—3 of FIG. 2.

Referring now to the drawings wherein the showings are for the purposes of illustrating the preferred embodiments of the invention only and not for purposes of limiting same, FIGS. 1–3 show the first embodiment of the self-adjusting tappet switch 1 according to the present invention. The tappet switch 1 is mounted in an installation opening 3 of an installation part 5, for example the retaining sheet metal of a motor vehicle. The tappet switch 1 includes a housing 7 which is formed to define an extension 7a at the upper side of the housing, the extension being adapted to engage the installation opening 3, whereby the extension 7a or the installation opening 3 are designed in such a manner that after insertion of the tappet switch 1 or the housing 7 into the installation opening 3, rotation of the switch housing 7 around the longitudinal axis of the tappet switch 1 is enable.

A slider member 9 is provided within the housing 7. The slider member is displaceably guided in the longitudinal axis of the tappet switch 1. To that end, as shown in FIG. 1 and 2, the slider member 9 includes a base 9a, which is guided laterally through the inner walls of the housing 7. In addition, the base 9a defines a recess opening 9d which is adapted for receiving a pin 11, extending in the direction of the overall longitudinal axis of the switch. The pin and recess opening 9d facilitate additional longitudinal guidance for the slider member 9.

The base 9a has, at its bottom end, a recess 13, which serves for receiving an upper area of a coil spring 15. The coil spring supports itself with its upper end against the upper inner wall of the recess 13 and with its lower end against the bottom of housing 7. A hollow cylindrical projection 17 is formed at the bottom of the housing 7 for providing fastening and guidance of the coil spring. The projection 17 is sized to engage the interior surface of the coils of coil spring 15.

The coil spring 15 acts upon the slider member 9 in such a manner that the slider member is pressed against the inner wall of the cover area of the housing by means of a projection 9c provided at the upper end of the slider, which, in its preferred form, is shaped in the form of a ring. The ring or annular-shaped projection 9c thus serves as a stop lug for limiting the longitudinal displacement of the slider in an upward direction as viewed in FIGS. 1 and 3.

Figure 5:
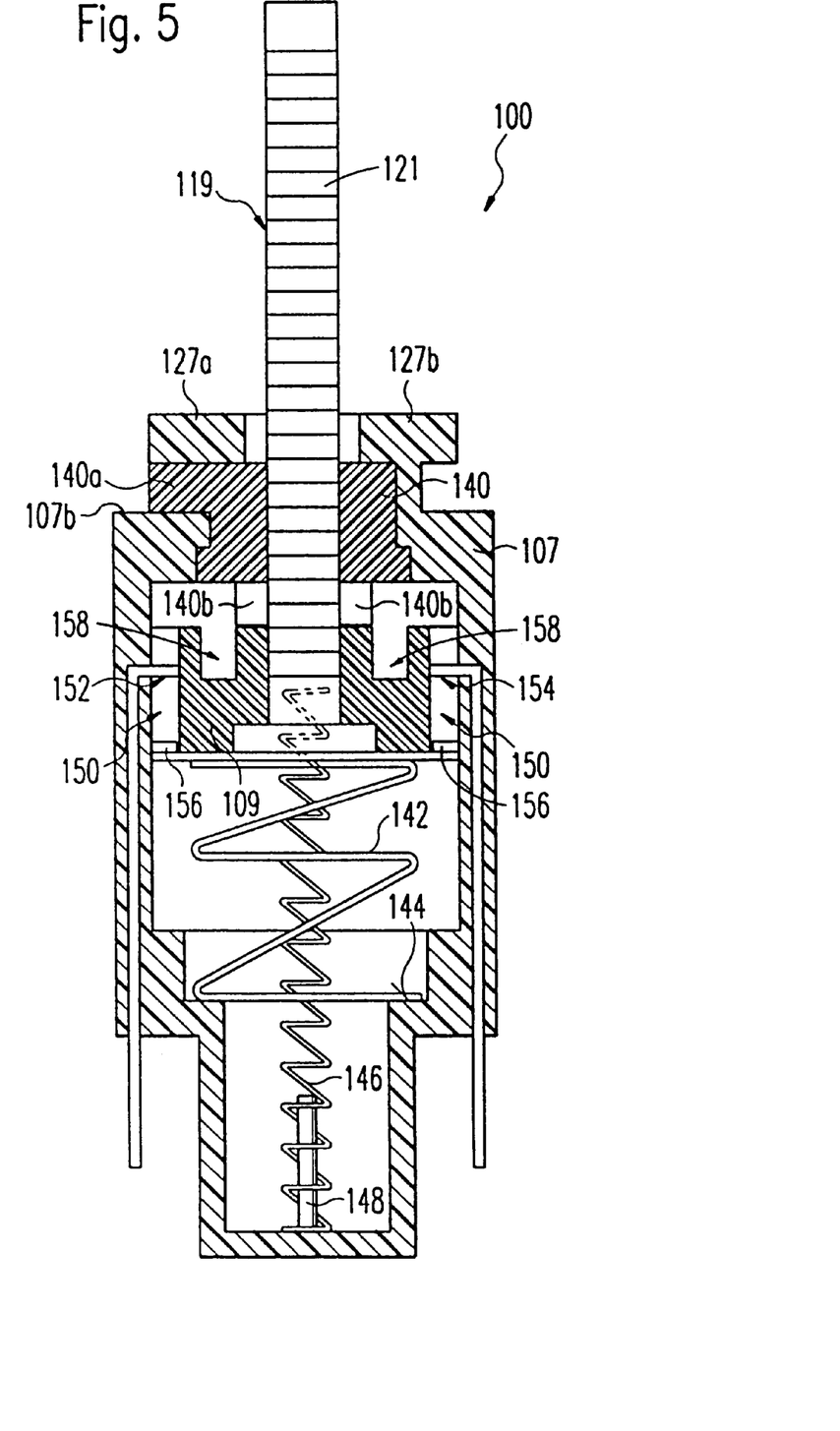
FIG. 5 is a longitudinal section through the switch shown in FIG. 4a in an adjustment and installation position of the tappet and slider member system; and, FIG. 6 is a longitudinal section through the switch shown in FIGS. 4 and 5 in a mounted or tappet and slider member locked position.
Figure 6:
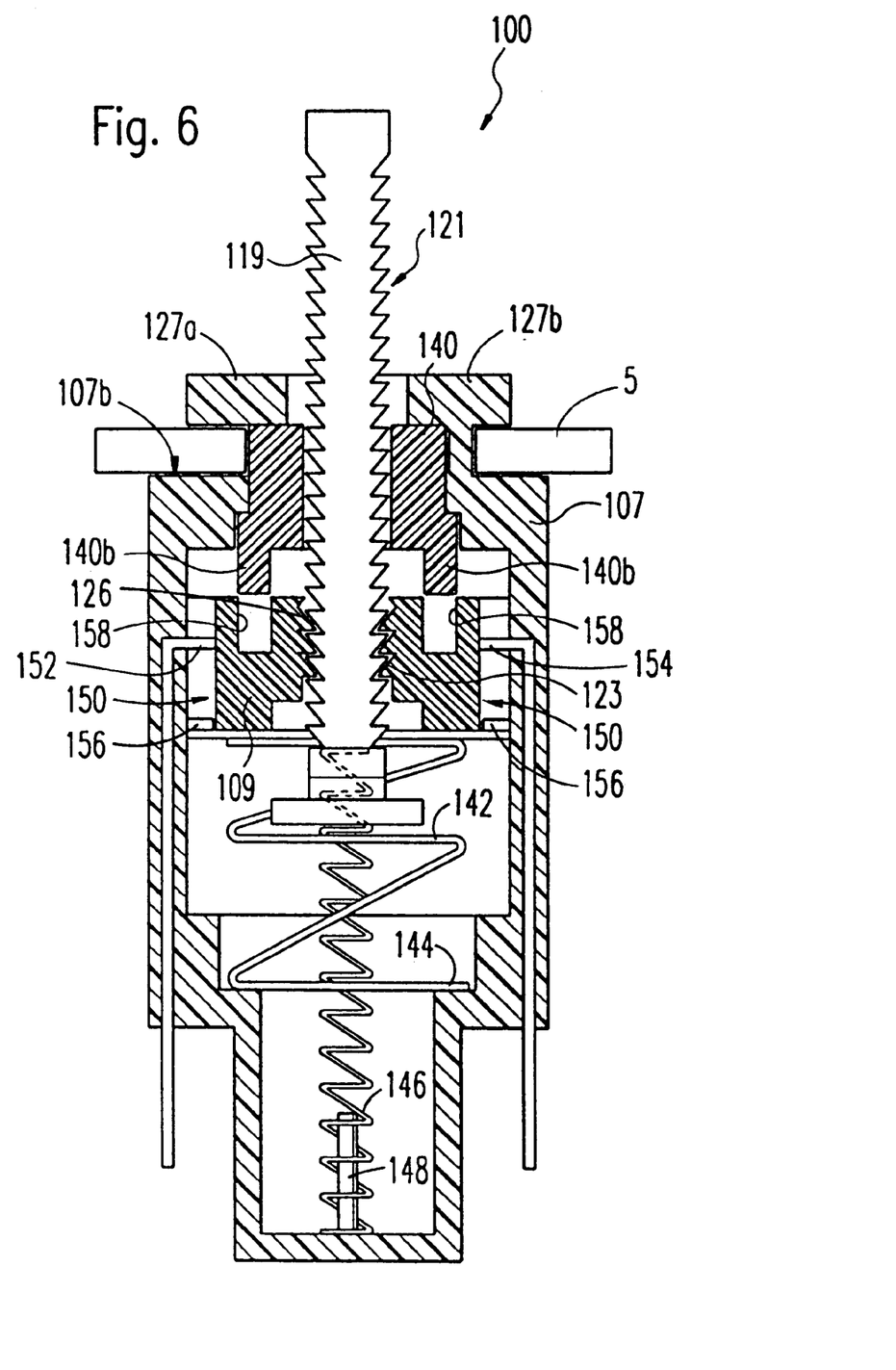

To effect electrical switching in the subject embodiment, the slider member 9 carries one or more contact elements (not shown) having one or more electrical contacts therein. The one or more contact elements are preferably arranged in the lower portion 9a of the slider in a well known manner and are arranged to function in cooperation with one or more electrically conductive elements (not shown) carried on the housing such as illustrated in FIGS. 5 and 6 and described below.

The slider member 9 is preferably formed in the shape of a hollow cylinder as shown, whereby a tappet member 19 engages, from above, with the slider member. Tappet member 19 has in the area which engages with the slider member 9, an arresting means 21, which, as shown in FIGS. 1 and 3, are preferably formed as a plurality of longitudinally spaced apart circumferential serrations. The plurality of spaced apart serrations 21 cooperate with a resilient engagement member 23, arranged at least in part inside the slider member 9 as shown. In the preferred embodiment illustrated, the engagement member 23 is a spring with a pair of opposing resilient arms 23a, 23b as shown in FIG. 3.

As further shown in the FIGURES, the cross-section of the subject tappet switch 1 in the area of the arresting means 21 is formed in a manner that the resilient arms 23a, 23b of the engagement member 23 in a first angular position of the tappet member 19 extend radially inwardly to engage the outer surface of the arresting means 21. However, there is provided sufficient annular space between the exterior side of the arresting means 21 and the interior wall of the slider member 9 in order to facilitate an arresting longitudinal displacement of the tappet member 19 relative to the slider member 9. In other words, the annular space in the first angular position of the tappet member 19 is large enough in order to facilitate a radial movement of the resilient arms 25a, 23b toward the outside so that the resilient arms 23a, 23b are movable via the stop teeth of the arresting means 21. The first angular position of the tappet member relative to the slider member defines the adjustment and installation position of the subject tappet switch 1 of the tappet-slider system as best shown in FIGS. 1 and 3.

Rotation of the tappet member 19 around its longitudinal axis by a specified angular degree increment results in a greater cross section diameter of the tappet disposed between the pair of resilient arms 23a, 23b. The tappet member 9 in the area of the arresting means 21 is essentially oblong or elliptical in cross section. In the second angular position, only a very small annular space remains between the outside wall of the tappet member 19 in the area of the subject switch between the arresting means 21 and the interior wall of the slider member 9. The annular space is selected to be small enough that a radial movement of the resilient arms 23a, 23b toward the outside is substantially totally blocked or at least decreased to the extent that the resilient arms can no longer glide over the tips of the arresting teeth. In this second angular position of the tappet member relative to the slider member, there thus occurs a locking of the tappet-slider system. That is, the tappet member 19 becomes locked to the slider member 9 in the second angular position of the tappet member relative to the slider member.

In order to facilitate simple rotation of the tappet member relative to the slider member, a projection is provided on an exterior wall of the tappet member 19. The projection 25 extends in the operating direction of the tappet member or the longitudinal axis of the switch (up and down in FIG. 1) and also extends radially outwardly to cooperate with a corresponding encoding recess 3a (FIG. 2) formed in the installation opening 3 of the operatively associated installation part 5.

As is apparent from FIGS. 1 and 2, at least with respect to rotation in the direction of the arrow in FIG. 2, during installation of the tappet switch 1 in the installation opening 3, the tappet member 19 is held torsion-proof or non-rotatable about the overall general longitudinal axis of the switch in the installation opening by means of an abutment between the projection 25 against the lateral wall of the encoding recess 3a.

In order to ensure that the subject switch can be installed in only one single defined position in the installation opening, a set of attachment means 27a and 27b are provided on the extension member 7a of the housing 7. The attachment means 27a, 27b cooperate, in the sense of a defined installation of switch 1 in the installation opening 3, with corresponding encoding recesses 3b and 3c. As best shown in FIGS. 2 and 3, the attachment means 27a, 27b are formed as first and second tab members radially extending from the extension 7a toward the outside extending projections, which facilitate acceptance of the installation part 5 between the underside of the attachment means 27a, 27b and the upper side of shoulder 7b of the housing 7. Thus, shoulder 7b acts simultaneously as a stop or abutment for installing the housing 7 in the installation opening 3.

The tappet switch 1 thus is adaptable to be installed in a defined angular position in the installation opening with the aid of the attachment means 27a, 27b whereby the attachment means are pushed from below and through the encoding recesses 3b and 3c. With rotation of the switch housing 7 in a direction according to the arrow shown in FIG. 2, the attachment means 27a, 27b grip behind the installation part whereby the switch is joined to the installation part.

Simultaneously with the rotation of the housing 7, the tappet member 19 is held torsion-proof, or non-rotatable relative to the slider member 9, in the installation opening 3 through the mechanical contact interaction of the projection 25 with the encoding recess 3a, resulting in the locking of the tappet-slider system as described above. The mechanical contact between the projection 25 and the recess 3a and rotation of the housing 7 causes relative rotational movement between the tappet member 19 and the slider member 9, thereby changing, as the housing is rotated, the relative space between the arresting means 21 and the inside surface of the slider member 9 carrying the engagement parts 23a, 23b.

When installing the tappet switch 1 in the installation opening 3, it is pressed with the head 19a of the tappet against the respective side of an operatively associated activation element (not shown) for example a brake pedal. In order to facilitate tolerance compensation, switch 1 is inserted in the installation opening in the state in which tappet member 19 is in its highest arresting position, i.e., it protrudes the farthest out of the housing. In order to ensure self-adjusting of the switch, the distance between the installation part and the respective side of the activation element (not shown) is preferably smaller than the distance between the shoulder 7b of the housing 7 and the upper side of the head 19a of the tappet member 19. If this is the case, then head 19a, when installing the switch in the installation opening, will touch the underside of the activation element before shoulder 7b of housing 7 comes to rest against the underside of the installation part 5. With further insertion of housing 7 into the installation opening 3, the total tappet-slider system, as a result, is initially moved far enough into the switch until the slider member 9 has reached a defined position. The defined position is preferably oriented such that the base 9a of the slider 9 is moved against a stop, for example, the bottom of the housing 7. In that position, electrical contact can be made between the contact elements (not shown) and the electrically conductive element (not shown).

If, after reaching this switching position, the housing is moved further yet in the direction toward the activation element, then the adjustment and installation position of the tappet-slider system permits arresting longitudinal displacement until the shoulder 7b of the housing 7 rests against the underside of the installation part 5. In this position, then, the housing 7 is rotated in the manner described above while the tappet member 19 is held torsion-proof, or non-rotatable relative to the slider member 9, whereby, on the one side, housing 7 is arrested in or fastened to the installation opening 3, and on the other side, locking takes place of the tappet-switch system between the engagement parts 23a, 23b carried on the slider member 9 and the arresting means 21 carried on the tappet member 19.

As is apparent from FIG. 3, the switch according to this first preferred embodiment also includes the novel features that the slider member 9 also includes a projection 29 in its upper area which cooperates with an encoding recess formed in the installation opening 3. In the first preferred embodiment shown, the encoding recess 3c already serves for acceptance of the attachment means 27b for attaching the switch housing. The projection 29 thus blocks the rotation of the switch housing 7 until the slider member 9 has been pushed far enough into the housing so that the upper edge of the projection 29 comes to rest below the underside of the installation part 5. This path, and thereby the length and position of the upper edge of the projection, is preferably sized so that release of the rotational movement of the housing 7 via inward movement of projection 29 will not take place until reaching, or shortly before reaching, the desired switching position of the slider member 9.

In order to facilitate a corresponding switching movement of the slider member 9 after rotation of the housing 7 when the activation element is activated, the projection 29 must be in the rotated position. In that position, the tappet and slider members are assured to be locked together. In the first preferred embodiment illustrated, installation and locking of the switch and torsionally-proof connecting the slider member with the projection 29 takes place by rotation of the housing through approximately 90°. In the rotated position, a switching movement of the slider is thus realized by the encoding recess 3a, which is formed, for that purpose, with a minimum width so that in addition to projection 25 of the tappet member, space is also provided therein for the projection 29 of the slider 9. Of course, as will be appreciated by those skilled in the art, other types and styles of encoding recesses may also be provided for this purpose.

In order to prevent any damage or destruction to the switch in the event of an excessive lift of the activation element in a direction which is opposite the normal switching direction, i.e., with movement in the direction towards the installation part 5, a trailing latch or stop function has been integrated into the tappet member 19 in the first embodiment represented in FIGS. 1–3. For that purpose, the head 19a is displaceably retained in the free end of the tappet member 19 and is outwardly biased by a resilient spring 31 as shown. The displacement path of the head 19a is limited by abutment of the underside of the head against the tappet member body or by a stop lug member (not shown). The coil spring is designed in such a manner that a trailing effect, i.e., inward movement of the head 19a inside the tappet member takes place only when the slider member has already reached the desired position and self-adjustment has taken place. The desired position is the normal position of the slider member with a non-activated activation element. In the case where the activation element is a brake pedal, such movement of the locked tappet-slider system may, for example, occur by moving the lower end or lever of the brake pedal in a direction toward the steering wheel, with a claw, acting as a safety device of anti-theft means, for connecting the steering wheel with the brake pedal, whereby the upper lever part of the brake pedal, which cooperates with the tappet switch, correspondingly moves towards the switch, stressing the head 19a of the tappet 19.

Figure 4A:
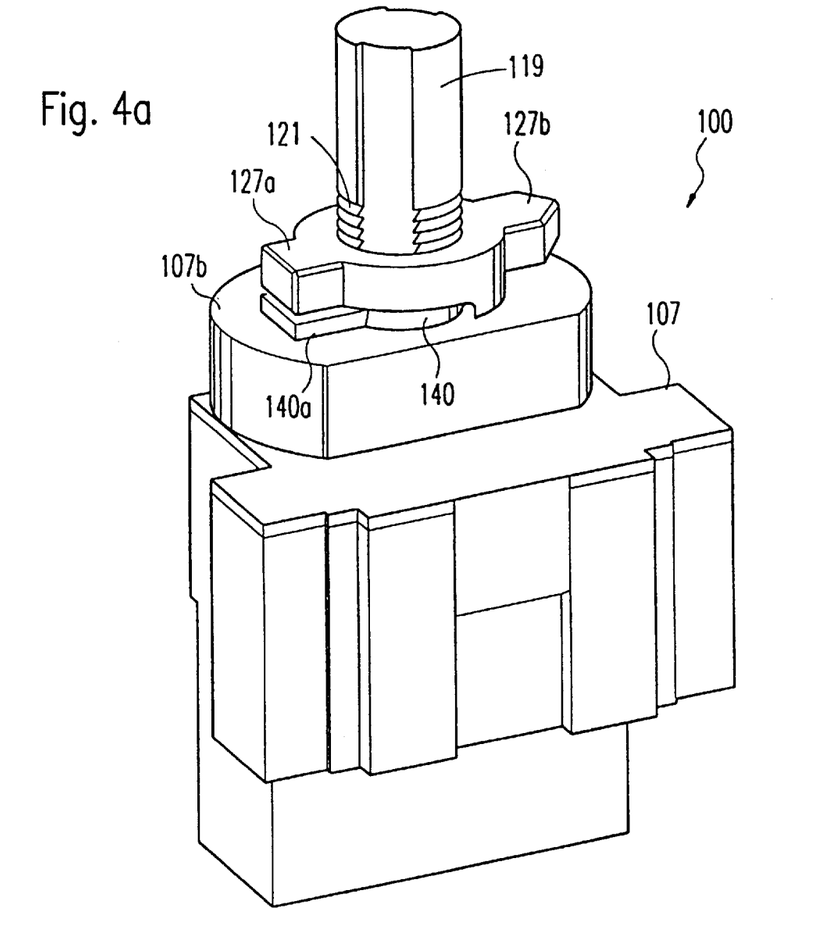
FIG. 4a is a perspective representation of an exemplary embodiment of a switch in accordance with the present invention.
Figure 4B:
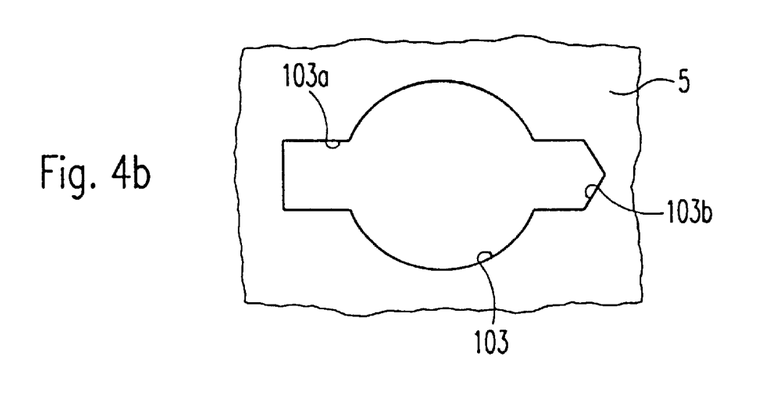

Turning now to FIGS. 4–6, a second preferred embodiment of the self-adjusting electric tappet switch of the present invention will be described. In that regard, FIG. 4a shows a perspective view of the subject tappet switch 100 including a housing 107 defining a shoulder 107b serving as a stop lug or a stop surface for installing the housing 107 in an installation opening 103 (FIG. 4b) of an operatively associated assembly part 5.

The tappet switch 100 includes fastening members 127a, 127b which serve for arresting or fastening the switch in the assembly part 5. The installation opening 103 has, to that end, correspondingly formed encoding recess 103a, 103b, so that the switch can be pushed from below with the fastening members 127a, 127b through the installation opening until the shoulder 107b abuts the underside of the assembly part 5. In this position, the switch is lockable relative to the assembly part 5 by simply turning or rotating the switch housing.

As shown in FIGS. 4b and 5, a rotatable separator piece 140 is provided in the upper region of the housing 107. The separator piece 140 is rotatable relative to the housing and includes a projection member 140a which, likewise, essentially corresponds to the shape of the encoding recess 103a as shown.

For inserting the switch 100 into the installation opening 103 of the assembly part 5, the separator piece 140 is turned or rotated relative to the housing 107 in such a manner that the projection 140a is essentially in alignment with the fastening means 127a. The projection 140a engages the encoding recess 103a of the assembly part 5 while the shoulder 107b of the housing 107 abuts the underside of the assembly part 5.

The tappet member 119 extends coaxially along the axis of rotation of the separator piece 140 opposite housing 107 in a slidable fashion via a corresponding recess in the separator piece 140. The cross section of the tappet member the recess in the separator piece 140 are chosen in such a manner that the tappet member 119 is held torsion-proof in the separator piece 140. That is, the tappet member 119 is not rotatable within the separator piece 140. Thus, the torsion-proof fastening (non-rotatable) of the separator piece 140 by means of the projection member 140a in the encoding recess 103a, the tappet member is also torsion-proof (non-rotatably) mounted to the assembly part 5. The tappet member, however, is slidable along its longitudinal axis within the separator piece 140. As a result, a twisting or rotating of the housing of the switch 100 relative to the assembly part 5 is also accompanied by a twisting, and thereby realizing a locking, of the tappet and slider member system in a manner to be subsequently described.

In order to permit locking, the tappet has, preferably on opposite longitudinal sides, locking means 121 which, as shown in FIG. 6, are preferably formed in a saw tooth-shaped notch arrangement. The locking means 121 cooperate with complimentary contact means 126, which are provided at the interior wall of the essentially annular-shaped slider member 109. In the unlocked state of the tappet and slider member system, a sliding displacement of the tappet member relative to the slider member is enabled in that the locking means 121 are rendered out of contact with the complimentary contact means 126.

For installing the tappet switch 100 in the installation opening 106, the tappet member 119 and the separator piece 140 are brought into an adjustment and installation position best shown in FIGS. 4a and 5. The adjustment and installation position permits the sliding displacement of the tappet member 119 relative to the slider member 109.

In the adjustment and installation position illustrated, the slider member is already advantageously disposed in the desired switching position. The slider member switching position is defined by the two extensions 140b at the underside of the separator piece 140, whereby the slider member 109 is pressed with its upper side against the contact surfaces 140b via a biasing spring action force. To that end, a spring member 142 acts upon the underside of the slider member 109 and, on the other side, upon a shoulder region 144 in the lower area of the housing 107.

In addition, a second biasing spring member 146 is provided which includes an upper end accepted into a recess formed on the underside of the tappet 119 and which acts, with its other end, upon the bottom of the housing 107. The spring 146 is preferably held at the bottom of the housing by means of a suitable pin 148 or other connecting device.

The switching position of the slider member 109 shown in FIGS. 5 and 6 is selected in a manner that upon elimination of the striker effect of the extensions 140b in a manner to be subsequently described, an adequate switch path is produced for activation of the electric contact 150. In that regard, the electric contact 150 consists of at least two contact elements 152, 154 which are preferably electrically connected through the underside of the slider member 109 by means of an electrically conducting element 156 formed on the slider member.

When inserting the switch 100 into the installation opening 106, the head of the tappet member is initially brought into contact with the respective side of an activation element such as a brake pedal or the like. After that, the switch is moved in the direction toward the activation element such as a brake pedal or the like, until the shoulder 107b rests against the underside of the installation part 5. During this process, the tappet member is displaced into the housing in a sliding fashion relative to the slider member 109, whereby the slider member is held via the spring member 142 in the switching position shown in FIG. 5.

Subsequent to the above steps, the housing 107 of the switch is next rotated in a manner described above by a specified predetermined angular increment, for example 90° thereby locking the tappet and slider member system. The locked position is best shown in FIG. 6. As is apparent from the above and as shown in the drawings, the rotating of the housing concurrently rotates the slider member 109 relative to the separator piece 140. In that way, the movement of the housing 107 concurrently achieves a modification in the relationship between the extensions 140b in a manner that the extensions lose their effectiveness as stop lugs against the slider member since they, as best shown in FIG. 6, thereafter face corresponding recesses 158 formed in the upper side of the slider member 109. In this manner, with movement of the activation element such as a brake pedal or the like away from the installation part 5, a switching path of the slider member in the same direction (away from the installation part) is enabled. Upon displacement or movement of the slider member 109 or of the tappet and slider member system, the extensions 140b engage the recesses 158. After traversing a given displacement path, the contact elements 152, 154 are thereby electrically connected via the conductive element 156 formed on the slider member thereby establishing an electrical closed contact path.

The switch construction of the second preferred embodiment prevents, in a very simple fashion, that any damage or destruction of the switch will occur upon a movement of the activation element in a direction opposite from the activation direction proper of the switch. To that end, the switch construction assures that the slider or the tappet and slider member system, starting in the switching position shown in FIGS. 5 and 6, has available an adequate displacement path in the respective activation direction (the downward direction in FIGS. 5 and 6). With this type of switch construction, it is not necessary to realize the trailing effect, stop lugs or the like implemented by means of a corresponding additional interlocking mechanism in the tappet member or the housing member. In addition, the preferred switch construction does not require any additional springs or biasing members or the like.

Turning now to FIG. 6, the saw tooth-shaped locking arrangement 121 is constructed in a manner that each tooth has an essentially horizontally extending upper and an obliquely extending lower area. The complimentary engagement means 126 of the slider member 109 are designed to intermate with the locking arrangement 121. The areas of each of the two engagement tooth arrangements 121 and/or of the contact means 126 cooperate during a first contact making engagement during the rotation of the slider member 109 with the housing 107 in order to lock the tappet and slider member system together. The engagement areas 121, 126 are preferably formed in a manner that no frontal surfaces abut each other at obtuse angles thereby blocking and/or locking rotational movement between the tappet and slider member. For that purpose, the leading or initial frontal surfaces or areas of the engagement portions 121, 126 may alternatively be formed to include an azimuthally extending pitch so that the lead areas of the frontal surfaces are reduced to form a first cutting edge on each tooth. The pitch extending in the azimuthal direction is constructed in such a manner that upon contact making of the initial areas of the locking teeth arrangements 121 and the contact means 126, with slightly staggered tooth systems, the tappet member with fixed slider is moved as far as is needed into the switch housing 107 until the tooth systems are in correct complimentary contact position. To that end, for example, the underside of each saw tooth of the contact means 126 may be formed to have in its initial area an azimuthally directed extending pitch extending from the superimposed oblique surface obliquely in the direction of the horizontally extending underside. Concurrently, the extremely small frontal surface or frontal cutting edge of each initial or lead area no longer extends in the radial direction but at such a pitch that with engagement of the initial areas of the tappet member and slider member tooth systems, the radially exterior areas first cooperate and only after certain overlapping of the tooth systems do the individual teeth interact fully in the sense of complete engagement.

As an alternative embodiment, instead of forming the azimuthal pitch on the undersides of the teeth of the slider member, the upper sides of the tappet member teeth can also be provided with corresponding complimentary slopes.

In contrast to the prior art known switches described above, the self-adjusting tappet switch according to the present invention greatly improves the installation and operating safety of the switch. In addition, although the preferred locking of the tappet and slider members take place by movement of the parts relative to each other, any other chosen manner of locking engagement may be used. As an example, the slider member may be displaceable in a plane extending vertically to the tappet member axis in order to bring corresponding engagement means to engagement, or in order to connect, after adjustment of the tappet member, with the slider member via insertion of a connection piece for example through a housing opening. Also, the locking of the tappet and slider member system and the simultaneous release of the switching path block can be accomplished by one or more separate actions. As an example, the locking can be accomplished by means of the described rotation of the tappet member relative to the slider member and the elimination of the stop lug effect can be effected through separate rotation or translatory movement of a stop lug element.

Instead of a stop lug for fastening the slider member in the specified switching position, the slider member can also be held in the desired position by one or more spring members and can, if needed, be deflected on either side from the thereby defined resting position in order to bring about the respective switching movement.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A self-adjusting tappet switch for mounting in an installation opening of an associated installation part, the tappet switch comprising:

a housing;

an electrical switch contact carried on the housing;

a slider member linearly movable within the housing between a first slider member position spaced apart from said electrical switch and a second slider member position contacting said electrical switch, the slider member including a first engagement portion; and, an elongate tappet member including a second engagement portion selectively intermateable with the first engagement portion to lock the tappet member to the slider member, a one of the tappet member and slider member being rotatable relative to the housing as the housing is rotated in the installation opening while the other of the tappet member and the slider member is held rotatable fixed relative to the housing to cause relative rotation between the tappet member and the slider member between i) a first installation and adjustment position whereat the first engagement portion is disengaged from the second engagement portion to permit relative linear arrested adjusting movement between the tappet member and the slider member for self-adjusting the switch, and ii) a second locked position whereat the first engagement portion is engaged with the second engagement portion to prevent relative linear movement between the tappet member and the slider member.

2. The self-adjusting tappet switch according to claim 1 wherein the housing includes a plurality of first attachment means for selectively connecting the housing to the associated installation opening when the housing is rotated.

3. The self-adjusting tappet switch according to claim 2 wherein, in said first installation and adjustment position, the first engagement portion and the second engagement portion permit relative linear motion between the slider member and the elongate tappet member.

4. The self-adjusting tappet switch according to claim 3 further comprising a resilient spring member disposed on the housing to bias the slider member and the elongate tappet member towards a rest position and permit said relative linearly arrested adjusting motion after the slider member reaches a switching position relative to the housing against said bias of said spring member.

5. The self-adjusting tappet switch according to claim 4 further including a stop lug member defining said switching position.

6. The self-adjusting tappet switch according to claim 5 wherein said one of the slider member and the elongate tappet member held rotatably fixed relative to the housing as the housing is rotated in the installation opening is prevented from movement into said second locked position until said one of said slider member and said elongate tappet member disengage from the installation opening of said installation part by linearly moving away from said rest position.

7. The self-adjusting tappet switch according to claim 3 further comprising a first resilient spring element biasing the slider member from said first slider member position towards said second slider member position.

8. The self-adjusting tappet switch according to claim 7 further comprising a second resilient spring element biasing said longitudinal slidable movement of the tappet member in a direction away from said housing.

9. The self-adjusting tappet switch according to claim 8 further comprising a separator piece movable relative to the housing between I) a first position preventing said slider member from moving from between said first slider member position and said second slider member position, and ii) a second position permitting movement of the slider member by said first resilient spring element.

10. The self-adjusting tappet switch according to claim 9 wherein:

said separator piece is rotatable together with said rotational movement of the tappet member relative to said housing; and, said tappet member is slidingly received on the separator piece is to permit said longitudinal slidable movement of the tappet member substantially without movement of the separator piece relative to the housing.

11. The self-adjusting tappet switch according to claim 10 wherein the slider member and elongate tappet member are movable relative to said housing in a direction away from a free end of the tappet member while in said second locked position.

12. A self-adjusting tappet switch comprising:

a housing selectively engagable in an installation opening of an associated installation part;

a slider member movable within the housing between a first slider member position and a second slider member position to activate an electrical switch contact on the housing, the slider member including a first engagement portion;

an elongate tappet member including a second engagement portion selectively intermateable with the first engagement portion to lock the tappet member to the slider member; and, as the housing is rotated in said installation opening, at least one of the tappet member and the slider member is carried with the housing while the other one of the tappet member and the slider member is held fixed relative to the associated installation part to cause relative rotational movement between the tappet member and the slider member, the tappet and slider members being thereby disposed between i) a first installation and adjustment position disengaging the first engagement portion from the second engagement portion to permit relative linear arrested adjustment movement between the tappet member and the slider member for self-adjusting the switch, and ii) a second locked position engaging the first engagement portion with the second engagement portion to prevent said relative linear arrested adjustment movement between the tappet member and the slider member.

13. The self-adjusting tappet switch according to claim 1 wherein the tappet member is rotatable relative to the housing as the housing is rotated in the installation opening while the slider member is held rotatably fixed relative to the housing to cause said relative rotation between the tappet member and the slider member between said first installation and adjustment position and said second locked position.

14. The self-adjusting tappet switch according to claim 13 wherein:

the tappet member includes a projection member engaging the installation part when the housing is mounted in the installation opening to cause relative rotation between the housing and the tappet member as the housing is rotated in the installation opening; and, the slider member is limited to only linear motion relative to the housing by a pin member connecting the slider member to the housing.

\* \* \* \* \*